United States Patent [19]

Shaw et al.

[11] Patent Number: 6,135,857

[45] Date of Patent: Oct. 24, 2000

[54] METHOD FOR SURFACE ENHANCEMENT BY FLUID JET IMPACT

[75] Inventors: James S. Shaw, Hampton Falls, N.H.; James N. Fleck, Boxford, Mass.

[73] Assignee: General Electric Company, Cincinnatio, Ohio

[21] Appl. No.: 09/033,164

[22] Filed: Mar. 2, 1998

[51] Int. Cl.$^7$ .................................................. B24B 1/00
[52] U.S. Cl. ................................................ 451/39; 451/40
[58] Field of Search .................................. 451/38, 39, 40

[56] References Cited

U.S. PATENT DOCUMENTS

| | | | |
|---|---|---|---|
| 3,939,613 | 2/1976 | Ayers | 51/320 |
| 5,305,361 | 4/1994 | Enomoto et al. | 376/316 |
| 5,778,713 | 7/1998 | Butler et al. | 72/53 |
| 5,791,968 | 8/1998 | Matsumura et al. | 451/5 |

*Primary Examiner*—Timothy V. Eley
*Assistant Examiner*—Dung Van Nguyen
*Attorney, Agent, or Firm*—Andrew C. Hess; Gerry S. Gressel

[57] ABSTRACT

A process for manufacturing a component in which residual tensile stresses are present in the component surface as a result of the operation by which the surface was produced. The process generally entails removing residual tensile stresses and inducing compressive stresses in the surface of a component by controlled impacting of the surface with two or more jets of fluid. An additional benefit of this invention is that damaged surface regions of the component can be removed simultaneously with residual tensile stresses by abrading the damaged surface region with a jet of abrasive fluid. The fluid jet employed to abrade the component surface is preferably at a pressure of at least 1360 bar, while the fluid jet employed to induce compressive stresses in the component surface is preferably at a pressure of at least 1700 bar. The second fluid jet can be operated to remove any embedded abrasive grit remaining from the first fluid jet operation.

18 Claims, No Drawings

METHOD FOR SURFACE ENHANCEMENT BY FLUID JET IMPACT

FIELD OF THE INVENTION

The present invention generally relates to processes employed in the manufacture of components. More particularly, this invention relates to a manufacturing method for reducing residual tensile stresses and creating compressive stresses in a component with a jet of high pressure fluid to improve the service life of the component.

BACKGROUND OF THE INVENTION

The processing of a component that will be later subjected to stresses in service has a significant effect on the service life of the component. A major factor determining the service life of a component is surface integrity, which may be defined as the result of alterations produced in a surface layer during manufacture of a component and which affect the material properties and performance of the component in service. Typically, three factors are considered for surface integrity: surface finish, microstructure and residual stress. The prior art has long given considerable attention to a component's surface finish and physical and material properties in order to meet design requirements such as strength, fatigue and wear, with finish grinding, honing, lapping, polishing, electropolishing and abrasive superfinishing techniques used to achieve various levels of surface finish. However, because the shape and orientation of the abrasive particles used in finish grinding and other finishing techniques cannot be controlled, material removal by such techniques cannot be controlled in a manner that will predictably and controllably remove residual tensile stresses induced in the surface by the manufacturing operation used to form the surface, such as turning, milling, etc. Consequently, the prior art has conventionally relied on peening with glass or steel shot to create a compressive layer in a component surface to compensate for machining damage and detrimental residual tensile stresses that were imparted during the manufacture of the component. Shot peening has also been employed to suppress crack growth associated with surface and near-surface inclusions in machined powder metal components. Accordingly, shot peening of the surfaces of machined components is widely employed to improve the service life of such components.

However, the service life of the component can be reduced as a result of cold working caused by high intensity and high coverage peening employed to overcome significant levels of residual stresses in a component surface. To reduce the negative effects of surface cold working, attempts have been made to reduce the intensity and coverage of the operation, and to use different shot size and material. Such attempts have had a negative impact on service life and/or manufacturing costs.

Therefore, it would be desirable if a method were available for improving the service life of a component by improving the surface integrity of a component, while overcoming the shortcomings of conventional shot peening techniques.

SUMMARY OF THE INVENTION

According to the present invention, there is provided a process for manufacturing a component in which residual tensile stresses are present in the component surface as a result of the operation by which the surface was produced. Generally, the process of this invention entails removing residual tensile stresses and inducing compressive stresses in the surface of a component by controlled impacting of the surface with two or more jets of fluid. An additional benefit of this invention is that damaged surface regions of the component can be removed simultaneously with residual tensile stresses by abrading the damaged surface region with a fluid jet containing abrasive particles. The process of this invention is applicable to stresses and damage induced by essentially any operation performed during the manufacture of a component. The benefits of the process are particularly realized where surface stresses and damage are the result of a component having been conventionally machined, i.e., milling, turning, grinding, etc., with a cutting tool.

According to the invention, it is possible to employ fluid jets at pressure levels sufficient to achieve the desired results, with sufficient coverage to uniformly treat the entire component surface. The fluid jet employed to abrade the component surface is preferably at a pressure of at least 1360 bar, while the fluid jet employed to induce compressive stresses in the component surface is preferably at a pressure of at least 1700 bar. In practice, the removal of about 25 to 50 $\mu$m (about 0.001 to 0.002 inch) of damaged surface material with the abrasive fluid jet simultaneously reduces or eliminates residual tensile stresses caused by machining. The second fluid jet is then preferably operated to induce compressive stresses in the surface of the component as well as remove any embedded abrasive grit remaining from the previous fluid jet operation. Either or both of the fluid jets can be pulsed.

According to this invention, fluid jet treatment of a component surface has the advantageous ability to remove surface damage and significant levels of residual tensile stresses while inducing a beneficial level of compressive surface stresses without cold working the surface to an extent that would be detrimental to the service life of the component. This aspect of the invention is possible in part because the fluid jet pressures required to induce compressive stresses comparable to that obtained by shot peening are lower than the localized surface stress imparted by shot peening. The lower pressures enabled by this invention also have the advantage of controlling and reducing preferential surface material growth which would otherwise lead to part distortion.

Other objects and advantages of this invention will be better appreciated from the following detailed description.

DETAILED DESCRIPTION OF THE PREFERRED EMBODIMENT

A process is provided for reducing residual tensile stresses induced in the surface of a component during manufacture of the component. The process is particularly applicable to components fabricated by machining, e.g., turning, milling, grinding, etc., though it is foreseeable that the components produced by other methods could benefit from the teachings of the invention.

The invention is generally directed to inducing compressive stresses in the surface of a component, and to reducing and/or compensating for residual tensile stresses created during the fabrication of the component. In lieu of the prior art practice of shot peening, this invention entails removing residual tensile stresses by controlled impacting of the surface with a jet of fluid. In a preferred embodiment of this invention, two fluid jet treatments are performed, a first of which entails removing damaged surface regions of the component in a manner that also removes residual tensile stresses from the surface of a component. This initial step is preferably performed by the use of an abrasive media, such as garnet, aluminum oxide or silicon carbide, entrained in a fluid jet. While various fluids could be used, water is preferred as being environmentally safe and because it will not chemically affect the surface of most metallic materials. A suitable particle size for the abrasive media is about 80 to about 400 mesh, though the use of larger and smaller particles is foreseeable. Generally, the removal of about 25 to 50 $\mu$m of material is sufficient to eliminate typical surface damage and residual tensile stresses caused by conventional machining operations, though it is foreseeable that lesser or greater material removal may be warranted.

The general technology for using a fluid jet containing abrasive particles to remove material from an article is known. However, in the present invention, the technology is applied to remove damaged surface material and residual tensile stresses, in combination with a second fluid jet treatment tailored to produce compressive stresses in the surface of an article. While the second fluid jet treatment can be performed without prior removal of damaged surface material and tensile stresses, doing so has been determined to be significantly less effective in producing a desired level of compressive stresses that appreciably promotes the service life of a component.

According to the invention, to remove damaged surface material and residual tensile stresses, the first fluid jet treatment using the abrasive media must be performed at a pressure level sufficient to achieve the desired results, and with sufficient coverage to uniformly treat the component surface. The abrasive fluid jet is preferably maintained at a pressure of at least 1360 bar, with a preferred range being about 2000 to about 3500 bar. Because of the abrasive nature of this step, the jet angle of attack, cross-section and rate of traversal across the surface of the component are also preferably carefully controlled. In a preferred embodiment, an abrasive grit entrained in a water jet at a pressure of about 3500 bar is discharged from a single or multiple nozzles, each having a diameter of about 0.020 to about 0.080 inch (about 0.5 to about 2 millimeters) and spaced about 0.25 to about 6 inches (about 0.6 to about 15 centimeters) from the targeted surface. A preferred angle of attack for the water jet is about 75 to about 90 degrees, with a preferred rate of traversal being about 22,000 to about 44,000 inches/minute (about 560 to about 1120 meters/minute). The parameters noted for this treatment are preferably coordinated through the use of a numerical control (NC) program that assures complete coverage of the component surface. Numerical control of the abrading process is particularly desirable if the jet is pulsed due to system or processing requirements.

Once the damaged surface regions are removed and residual tensile stresses are removed or at least reduced by the abrasive jet, the second fluid jet is employed to induce compressive stresses in the component surface. A preferred pressure for this operation is at least 1700 bar, with a preferred range being about 2000 to about 3700 bar. In addition to being capable of inducing compressive stresses in the surface of a metallic component, such pressures also enable the second water jet to remove any embedded abrasive grit remaining from the abrasive jet treatment. As with the abrasive jet, the jet angle of attack, cross-section and rate of traversal across the surface of the component are also preferably carefully controlled to obtain optimal compressive stresses in the surface of a component.

A suitable fluid jet treatment for inducing compressive stresses in a component surface is to discharge water at a pressure of about 3000 bar from a single or multiple nozzles, each having a diameter of about 0.010 to about 0.020 inch (about 0.25 to about 0.5 millimeters), and spaced about 0.25 to about 3 inches (about 0.6 to about 7.5 centimeters) from the targeted surface. A preferred angle of attack for the water jet is about 75 to about 90 degrees, with a suitable rate of traversal being about 10,000 to about 20,000 inches/minute (about 250 to about 500 meters/minute). As with the abrasive water jet treatment, the parameters noted for this treatment are preferably coordinated through the use of a numerical control (NC) program that assures complete coverage of the component surface, particularly if the jet is pulsed. While the above parameters have been identified as achieving acceptable results, it is foreseeable that process parameters other than those noted could be capable of inducing compressive stresses in a component surface in accordance with this invention. Furthermore, additional water jet treatments could be performed if necessary or desired to tailor the distribution and level of compressive stresses in the component surface.

According to this invention, a series of water jet treatments of the type described above is capable of removing surface damage and significant levels of residual tensile stresses while inducing a beneficial level of compressive surface stresses, without the negative effect of cold working the surface as noted when shot peening is employed to treat component surfaces with similar surface conditions. Notably, the pressures indicated above for the second water jet treatment are capable of inducing compressive stresses comparable to that obtained by shot peening, but at significantly lower localized surface stresses than that required when shot peening to achieve similar results. An added benefit attributable to the lower pressures enabled by this invention is that preferential surface material growth that would otherwise lead to part distortion is reduced and controlled.

While the invention has been described in terms of a preferred embodiment, it is apparent that other forms could be adopted by one skilled in the art. For example, the water jet treatments of this invention can be employed to suppress crack growth associated with surface and near-surface inclusions in powder metal components. Particular examples are powder metal components formed of superalloys. Accordingly, the scope of our invention is to be limited only by the following claims.

What is claimed is:

1. A process for manufacturing a component in which residual tensile stresses are present in a surface of the component, the process comprising the steps of reducing the residual tensile stresses in the surface of the component by impacting the surface with a first jet of fluid to remove a layer of material at the surface and thereby expose and define a treated surface, and then inducing compressive stresses in the treated surface by impacting the treated surface with a second jet of fluid that does not have abrasive particles entrained therein so as not to remove material from treated surface.

2. The process of claim 1, wherein the residual stresses are induced in the component by machining.

3. The process of claim 1, wherein the first jet of fluid is at a pressure of at least 1360 bar.

4. The process of claim 1, wherein the second jet of fluid is at a pressure of at least 1700 bar.

5. The process of claim 1, wherein the second jet of fluid is pulsed.

6. The process of claim 1, wherein the surface of the component is further characterized by a damaged surface region, the damaged surface region being impacted by the first jet of fluid to remove the damaged surface region and the residual tensile stresses therein prior to impacting with the second jet of fluid to induce compressive stresses therein.

7. The process of claim 6, wherein the first jet of fluid has abrasive particles entrained therein.

8. The process of claim 6, wherein the damaged surface region is formed in the component by machining.

9. The process of claim 1, further comprising the step of additionally impacting the treated surface with the second jet of fluid to vary the distribution and level of compressive stresses in the surface.

10. A process for manufacturing a component, the process comprising the steps of:

reducing residual tensile stresses in a surface of a component by abrading the surface of the component with a first jet of abrasive fluid to remove about 25 to 50 $\mu$m of material from the surface and thereby expose and define a treated surface; and inducing compressive stresses in the treated surface of the component by impacting the treated surface with a second jet of fluid that does not have abrasive particles entrained therein.

11. The process of claim 10, wherein the surface of the component is formed by machining.

12. The process of claim 10, wherein the first jet of abrasive fluid is at a pressure of about 2000 to about 3500 bar.

13. The process of claim 10, wherein the second jet of fluid is at a pressure of about 2000 to about 3700 bar.

14. The process of claim 10, wherein the first jet of abrasive fluid comprises abrasive particles having a size range of about 80 to about 400 mesh and entrained in water.

15. The process of claim 10, wherein the component has a damaged surface region, and wherein the damaged surface region is abraded with the first jet of abrasive fluid to remove the damaged surface region.

16. The process of claim 15, wherein the damaged surface region is formed in the component by machining.

17. The process of claim 10, wherein the second jet of fluid is pulsed.

18. A process for manufacturing a component, the process comprising the steps of:

machining a component;

removing damaged surface regions and residual tensile stresses in a surface of the component by abrading at least 25 $\mu$m from the surface of the component with an abrasive water jet at a pressure of about 2000 to about 3500 bar; and inducing compressive stresses in the surface of the component by impacting the surface with a nonabrasive water jet at a pressure of about 2000 to about 3700 bar so as not to remove material from the surface.

* * * * *